June 16, 1925.
W. A. SHARPE
1,541,860
CARBON BLACK AND POWER GENERATOR
Filed Oct. 9, 1923   2 Sheets-Sheet 1
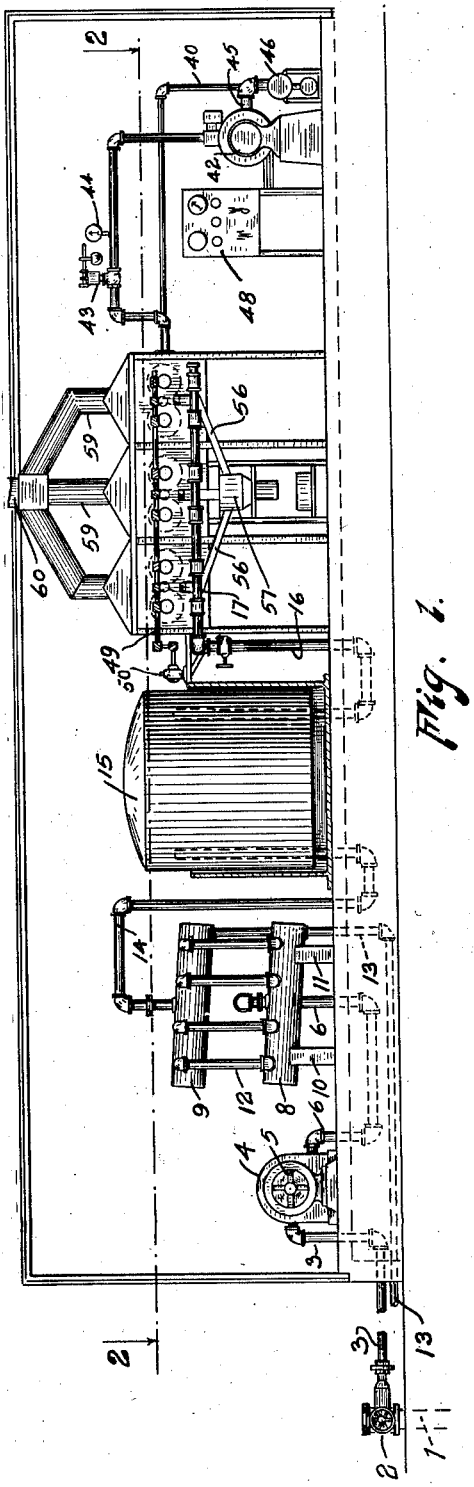
Fig. 1.
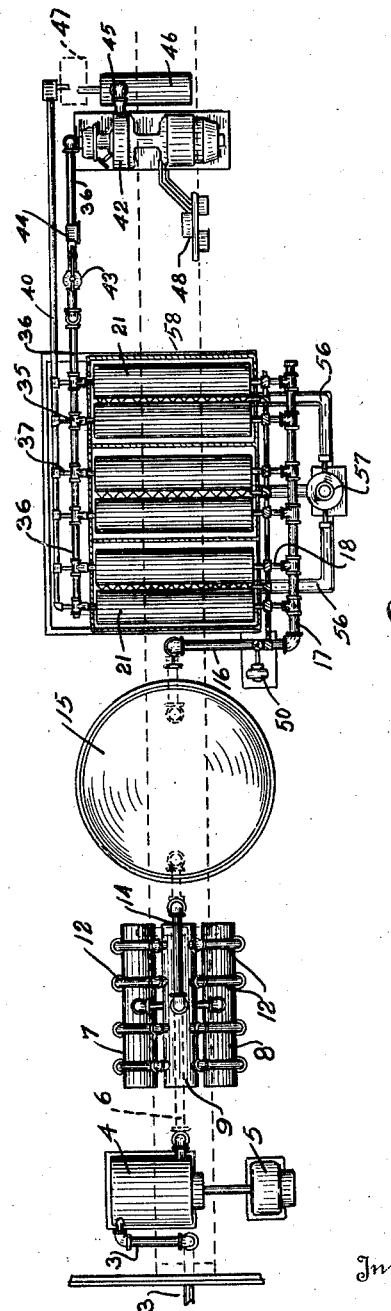
Fig. 2.
Inventor
William A. Sharpe.
Attorney June 16, 1925.
W. A. SHARPE
CARBON BLACK AND POWER GENERATOR
Filed Oct. 9, 1923  2 Sheets-Sheet 2
1,541,860
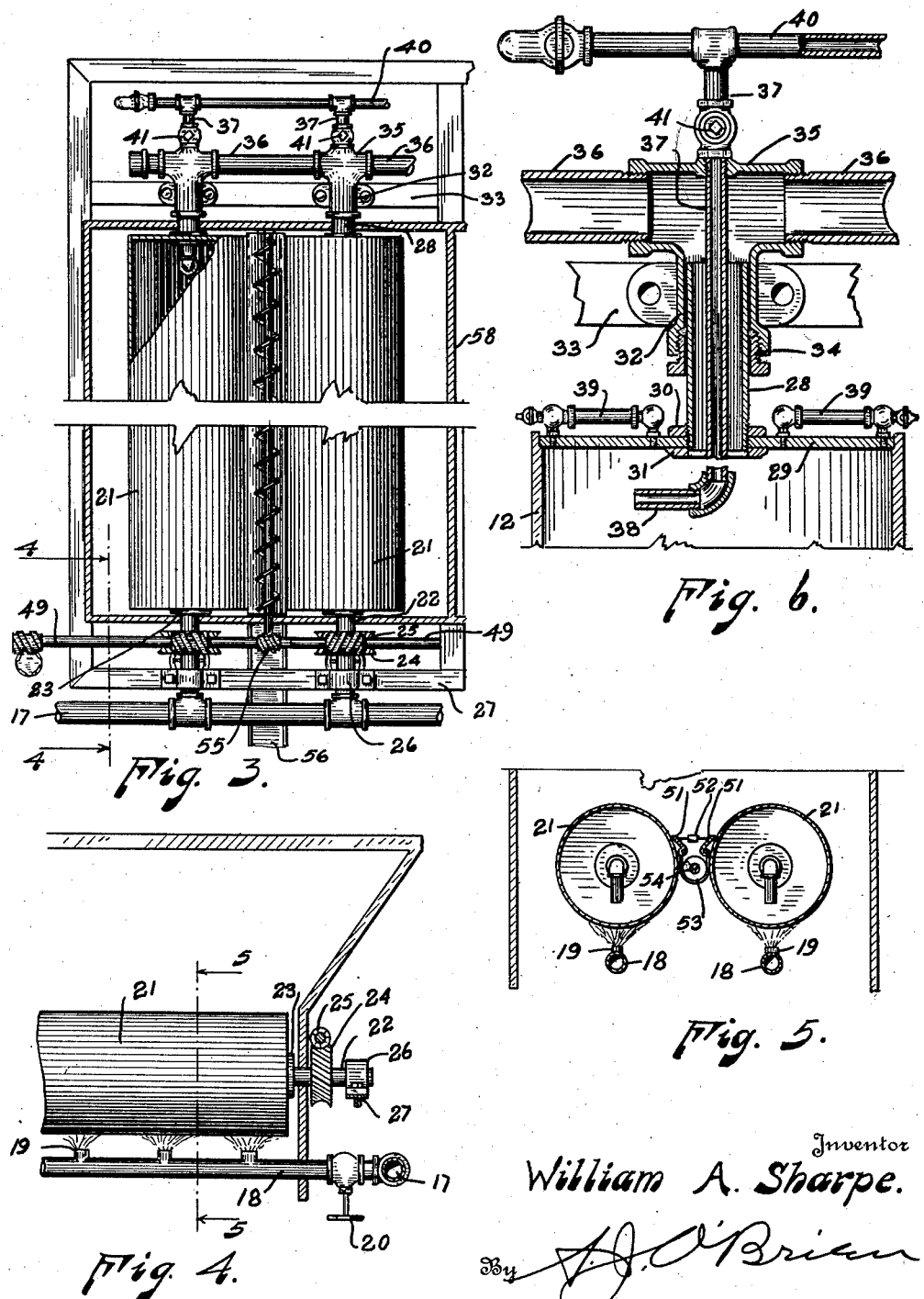

Patented June 16, 1925.

1,541,860

UNITED STATES PATENT OFFICE.

WILLIAM A. SHARPE, OF DENVER, COLORADO, ASSIGNOR TO HARRY R. ROGERS, FRED. B. ROGERS, L. T. MARTIN, A. L. MILLER, LON GALBREATH, LAWRENCE JOHNSON, AND WM. A. SHARPE, TRUSTEES OF CONSOLIDATED PRODUCERS TRUST, OF LUSK, WYOMING, ORGANIZED UNDER COMMON LAW.

CARBON-BLACK AND POWER GENERATOR.

Application filed October 9, 1923. Serial No. 667,562.

*To all whom it may concern:*

Be it known that I, WILLIAM A. SHARPE, a citizen of the United States, residing at the city and county of Denver and State of Colorado, have invented certain new and useful Improvements in Carbon-Black and Power Generators; and I do declare the following to be a full, clear, and exact description of the invention, such as will enable others skilled in the art to which it appertains to make and use the same, reference being had to the accompanying drawings and to the characters of reference marked thereon, which form a part of this specification.

This invention relates to a device by means of which the energy contained in natural gas can be converted into power and the heat generated by the gas as it is converted into carbon-black conserved by means of steam boilers that produce steam for the generation of power.

In various parts of this country natural gas is available in large quantities, but the wells are so located that it is not practicable, for financial reasons, to conduct the gas to some large city or factory where it could be profitably disposed of. As a result of the above, many gas wells are in existence, which have been capped to prevent the escape of the gas, and are unproductive. It has been proposed to burn the gas in such a way that it shall be converted into carbon-black, but as this wastes the energy, due to the pressure and also the heat developed during the burning, it is wasteful and has been prohibited by law in several places.

The gas exists under a pressure which sometimes reaches six or seven hundred pounds per square inch. It is evident that a large volume of gas under such pressure has stored in it an immense amount of energy which has heretofore been entirely wasted in reducing the gas to proper pressure for combustion.

It is one object of my invention to transform the potential energy in the gas into electrical energy after which the gas at greatly reduced pressure is transferred to gasometers.

Another object of my invention is to burn the gas in a suitable furnace and produce carbon-black. The heat from the combustion is utilized to generate steam which is used for the production of electrical energy.

By my method and by means of my apparatus, the total energy value of the gas can be utilized, a part thereof being converted into electrical energy of high potential, which can be readily transmitted long distances to places where it can be profitably disposed of, the remaining part of the energy of the gas is converted into carbon-black which is of great value in the arts.

I attain my objects by means of an apparatus, which I will now describe more or less in detail, reference for this purpose being had to the accompanying drawings, in which the apparatus is shown, and in which:

Fig. 1 shows a side elevation of my apparatus;

Fig. 2 shows a top plan view thereof;

Fig. 3 is a top plan view of one set of boilers, parts being broken away to better show the construction;

Fig. 4 is a fragmentary section taken on line 4—4, Fig. 3;

Fig. 5 is a section taken on line 5—5, Fig. 4; and

Fig. 6 is a horizontal diametrical section through the end of one boiler and shows the particular relationship of the water and steam pipes.

The same reference characters will be used to designate the same parts throughout the several views.

Numeral 1 designates a gas well and 2 the valve at the upper end of the casing. A pipe 3 extends to the turbine 4, which drives the electric generator 5. From the exhaust port of the turbine a pipe 6 extends to and connects with the upper side of the two lowermost containers 7 and 8 of the saturator. The saturator consists of three cylindrical members 7, 8 and 9 arranged one at each vertex of an isosceles triangle, cylinders 7 and 8 being at the ends of the base thereof. The cylinders 7, 8 and 9 are inclined slightly in the manner shown in Fig. 1 and cylinders 7 and 8 rest on concrete piers 10 and 11. A plurality of pipes 12 extend from cylinders 7 and 8 to a point near the top of cylinder 9. The lowermost point of each cylinder is connected by suitable pipes to the drain pipe 13 that extends to a reservoir (not shown). From the top of cylinder 9 a pipe 14 leads into the gasometer 15 which will not be described in detail as it is made in the usual way. From the gasometer a pipe 16 extends to a header 17 to which the pipes 18, that carry the burners 19, are connected. Each pipe 18 is independently controlled by means of a valve 20. The pipes 18 are supported and adjusted by any suitable means. Located above each row of burners is a boiler 21 which is rotatably mounted in a manner that will be hereinafter described. To one end of each boiler I attach a solid trunnion 22 which is provided with a suitable flange 23 that is riveted or bolted in place. To each trunnion 22 I connect a screw gear wheel 24 which cooperates with a screw or worm 25 in a manner to be hereinafter described. Trunnions 22 are mounted for rotation in bearings 26 that are supported on a suitable channel or angle frame 27. The opposite ends of the boilers have hollow trunnions 28 that are secured in an opening in the end 29 by means of suitable clamping collars 30 and 31, or by any other suitable means. Trunnions 28 are rotatably connected with bearings 32 that are bolted to the support 33. A stuffing box 34 is provided in the end of the bearing 32 in order that steam may not escape at this point. The end of bearing 32 is formed in the shape of a tee 35 to which the pipes 36 are connected. A pipe 37 extends inwardly through the bearing 32 and trunnion 28 and has its inner end 38 projecting downwardly for the purpose of delivering the feed water below the water level of the boiler. The end 29 of the boiler has several water glasses 39 by means of which the water level can be determined while the boiler rotates. A pipe 40 distributes the feed water to the several pipes 37 and the quantity admitted into each boiler is controlled by the valve 41. The steam pipe 36 extends to the intake port of a turbo-generator unit 42 and is provided with a safety valve 43 and pressure gage 44. From the turbo-generator the steam passes through pipe 45 to the condenser 46, from which the water is returned by means of a pump 47, through pipe 40 to the boilers. The electricity generated by the unit 42 is transmitted to switchboard 48 from which it is distributed as desired.

As one of the objects is the production of carbon-black, the boilers have been especially designed and mounted with this object in view. By referring to Figs. 3, 4 and 5, we will notice that the boilers are arranged in pairs. A shaft 49 is rotated by means of a motor 50. This shaft has screws or worms 25 which cooperate with the screw wheels 24 on trunnions 22 and rotate the two boilers of each pair in opposite directions, the reason for rotating the boilers being that, owing to the conditions under which the combustion takes place, carbon-black is formed on the outer surface of the boilers and this has to be removed and a clean surface provided. For the purpose of removing the carbon-black from the outside of the boilers, I provide a pair of scrapers 51 which are pivoted along a line parallel to the outer surface of the boilers, and are held in adjusted position by suitable means such as a turnbuckle 52. Suspended beneath the scrapers 51 is a trough 53 within which is a screw conveyor 54 that is rotated through the action of the worm 55 on shaft 49. The screw conveyor transfers the carbon-black to the chute 56 which conveys it to the packer 57. Each set of two boilers is enclosed in a suitable housing 58 which has a smoke flue 59 connecting it with a smoke stack 60. Suitable dampers are also provided, but these have not been shown as they are old and well known.

In the above description, I have used the term, "turbine," in referring to the engine 4 and have shown it as a turbine. I desire, however, that this shall be understood as illustrative only and not as a limitation, as it is obvious that any ordinary steam engine of the reciprocating type can be employed in place of the turbine shown.

My apparatus functions as follows: The high pressure gas from the well is passed through the turbine 4 where it expands adiabatically and rotates the turbine in the same manner in which this would be done by steam or any other elastic fluid. The gas, after it has passed through the turbine, is greatly reduced in pressure and temperature and flows through pipe 6 into the tanks 7 and 8 of the saturators where it expands further and where any condensate that has formed will be separated from the gas. In the upper cylinder 9 further separation takes place, after which the gas passes into the gasometer while the condensate flows through pipe 13 into a suitable reservoir. From the gasometer the gas flows to the burners 19 where it is burned in an atmosphere deficient in oxygen where the unconsumed carbon is deposited on the outside of the boilers and is finally scraped off and transferred to the packer. The heat of combustion is utilized for converting water into steam and the steam is used for driving a turbo-generator unit, after which it is condensed and returned at a high temperature to the boilers. From the above it is seen that there is no waste of power or energy. The energy due to the high pressure, is removed by the first turbine and the heat generated by the combustion of the gases is used to generate steam, the energy of which is transformed into electrical energy.

Having now described my invention, what I claim as new is:

1. A carbon-black retort comprising a pair of parallel cylindrical boilers rotatable on their central axes, means for rotating said boilers in opposite directions and towards each other at the top, a pair of scrapers, one cooperating with each boiler, said scrapers contacting with the adjacent sides of the boilers at a point between the vertical and horizontal diameters of the boilers, a screw conveyor located underneath each pair of brushes, pipes connected to the boilers for introducing water thereinto, means comprising pipes for conducting steam from the boilers, and a series of gas jets underneath each boiler.

2. A carbon-black retort comprising a pair of parallel cylindrical boilers rotatable on their central axes, means for rotating said boilers in opposite directions and towards each other at the top, a pair of scrapers, one cooperating with each boiler, said scrapers contacting with the adjacent sides of the boilers at a point between the vertical and horizontal diameters of the boilers, a screw conveyor located underneath each pair of brushes, pipes connected to the boilers for introducing water thereinto, means comprising pipes for conducting steam from the boilers, and a series of gas jets underneath each boiler, said water and steam pipes being concentric with the boilers.

3. A carbon-black retort comprising a pair of parallel cylindrical boilers rotatable on their central axes, means for rotating said boilers in opposite directions and towards each other at the top, a pair of scrapers, one cooperating with each boiler, said scrapers contacting with the adjacent sides of the boilers at a point between the vertical and horizontal diameters of the boilers, a screw conveyor located underneath each pair of brushes, pipes connected to the boilers for introducing water thereinto, means comprising pipes for conducting steam from the boilers, and a series of gas jets underneath each boiler, said water and steam pipes being concentric with the boilers, said steam pipe enclosing the water pipe and constituting a trunnion for the boiler.

In testimony whereof I affix my signature.

WILLIAM A. SHARPE.